United States Patent
Cheng

[19]

[11] Patent Number: 5,956,022
[45] Date of Patent: Sep. 21, 1999

[54] INTERACTIVE MONITOR TROUBLE-SHOOTING DEVICE

[75] Inventor: Kuei-Pi Cheng, Taipei, Taiwan

[73] Assignee: Mag Technology Co., Ltd., Taipei, Taiwan

[21] Appl. No.: 08/724,403

[22] Filed: Oct. 2, 1996

[51] Int. Cl.$^6$ .................................................. G09G 5/00
[52] U.S. Cl. ...................... 345/213; 345/117; 348/177
[58] Field of Search .......................... 345/211, 904, 345/212, 213, 117; 348/180, 184, 185, 177, 178, 563, 564, 569

[56] References Cited

U.S. PATENT DOCUMENTS

| | | | |
|---|---|---|---|
| 4,541,066 | 9/1985 | Lewandowski | 345/117 |
| 5,467,470 | 11/1995 | Ninomiya | 345/904 |
| 5,481,299 | 1/1996 | Coffey et al. | 345/212 |
| 5,491,794 | 2/1996 | Wu | 348/177 |
| 5,648,799 | 7/1997 | Kikinis | 345/212 |
| 5,675,364 | 10/1997 | Stedman et al. | 345/212 |
| 5,687,313 | 11/1997 | Hirosawa et al. | 345/117 |
| 5,696,978 | 12/1997 | Nishikawa | 345/212 |
| 5,757,366 | 5/1998 | Suzuki | 345/213 |

*Primary Examiner*—Amare Mengistu
*Assistant Examiner*—Ricardo Osorio
*Attorney, Agent, or Firm*—Smith, Gambrell & Russell, LLP; Beveridge, DeGrandi, Weilacher & Young Intellectual Property Group

[57] ABSTRACT

An interactive monitor trouble-shooting device includes a micro-processor based control unit which detects the horizontal synchronization signal and the vertical synchronization signal from the video card of a computer. If no such signals are detected, the control unit displays a series of trouble-shooting steps to be followed by the monitor user for fixing the problem of receiving no such synchronization signals. The trouble-shooting steps may also be displayed in such a manner to test the color display function of the monitor, wherein the monitor screen is divided into at least three sections or areas, each having a background color of one of the three elementary colors. The control unit also allows the monitor to enter a power saving mode when such synchronization signals are cut off during normal operation of the monitor.

5 Claims, 2 Drawing Sheets

INTERACTIVE MONITOR TROUBLE-SHOOTING DEVICE

FIELD OF THE INVENTION

The present invention relates to a computer monitor, such as a personal computer monitor, and in particular to a device which provides interactive communication with the computer user to detect trouble in installing the monitor.

BACKGROUND OF THE INVENTION

Computers are now a home electrical appliance. More and more people are beginning to install their own computer system by ordering computer parts from different suppliers or manufacturers. For those who are not professional in computer installation, installing a computer system all by themselves may not be easy and certain problems or troubles may be encountered. One of the most common problem is that no display appears on the monitor screen when the computer is powered on.

One reason for such a problem is that the monitor itself malfunctions. In such a situation, returning the monitor to the supplier or manufacturer for repair is inevitable. However, in most of the situations where the monitor displays nothing when the computer system is powered on, the monitor itself is in very good condition for display and the problem is that the monitor is not properly plugged in or connected to the computer system. In such a case, returning the monitor to the supplier is not only a waste of time and money for both the supplier and the consumer, but it also damages to the business reputation of the supplier.

Furthermore, the monitor may also be damaged during shipping back to the supplier. This causes further problems.

It is therefore desirable to provide a monitor trouble-shooting device which helps the computer consumer to investigate potential problems with the monitor that may be encountered during installing the monitor so as to at least partly overcome the problem discussed above.

SUMMARY OF THE INVENTION

The principal object of the present invention is to provide an interactive monitor trouble-shooting device which displays the possible trouble-shooting procedure to help the consumer solve the problem of no screen display of the monitor upon powering on the computer system.

It is another object of the present invention to provide a monitor self-testing device which displays a background on the monitor screen with the three elementary colors to detect if any of the three elementary colors is incorrect or missing.

In accordance with the present invention, there is provided an interactive monitor trouble-shooting device comprising a micro-processor based control unit which detects the horizontal synchronization signal and the vertical synchronization signal from the video card of a computer. If no such signals are detected, the control unit displays a series of trouble-shooting steps to be followed by the monitor user for fixing the problem of receiving no such synchronization signals. The trouble-shooting steps may also be displayed in such a manner to test the color display function of the monitor, wherein the monitor screen is divided into at least three sections or areas, each having a background color of one of the three elementary colors. The control unit also allows the monitor to enter a power saving mode when such synchronization signals are cut off during normal operation of the monitor.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
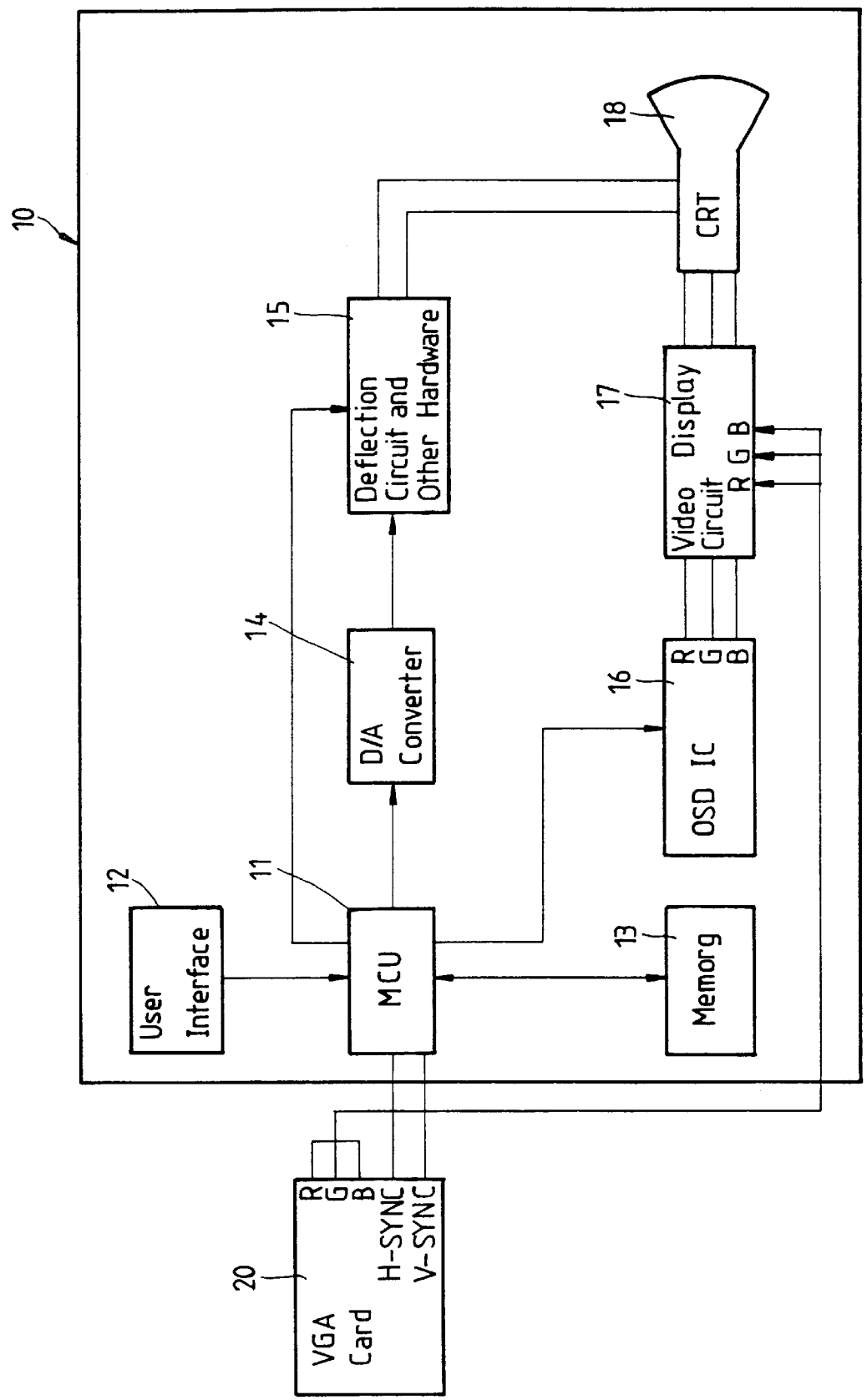
FIG. 1 is a block diagram of the monitor trouble-shooting device in accordance with the present invention.

With reference to the drawings and in particular to FIG. 1, wherein a block diagram of an interactive monitor trouble-shooting device in accordance with the present invention, generally designated with reference numeral 10, is shown, the device 10 is to be incorporated in a monitor comprising a micro-controller unit 11 (MCU), a user interface 12, a memory 13, a digital-to-analog converter (D/A converter) 14, a deflection circuit and other hardware 15, an on-screen display integrated circuit (OSD IC) 16, a video display circuit 17 and a cathode ray tube (CRT) 18.

As is known, the monitor receives, at the MCU 11 thereof, a horizontal synchronization signal H-SYNC and a vertical synchronization signal V-SYNC from a video graphic adaptor (VGA) card 20 installed in a computer system. The H-SYNC and V-SYNC signals are received at the MCU 11 to determine the frequency and operation mode to which the monitor is to be set. The MCU 11 compares the current frequency with the memory 13, which is preferably an EEPROM. If the frequency matches, then the MCU 11 retrieves the associated data from the memory 13, such as horizontal size (H-SIZE), vertical size (V-SIZE), contrast and so on. These data are then sent through the D/A converter 14 in order to control the deflection circuit and other hardware 15 so as to show the desired display on the CRT 18.

If the frequency does not match, then the MCU 11 displays data information on the CRT 18 to allow the user to modify these data through the user interface 12. The modified data are then deposited into the memory 13 for further use. In the modification process, the MCU 11 monitors the user interface 12 and shows icon images provided by the OSD IC 16 on the CRT 18 through the display circuit 17 to allow the user to modify.

In the case where the computer system is not powered on or in the case where the monitor is not properly connected to the video card 20 of the computer system, the MCU 11 receives no H-SYNC and V-SYNC signals. No display will be seen on the CRT 18 and the user will not be able to determine if the monitor is broken. Thus, in accordance with the present invention, when the monitor is powered on and the MCU 11 detects no H-SYNC and V-SYNC for the first time, the MCU 11 uses the OSD IC 16 to show a trouble-shooting display on the CRT 18 through the display circuit 17. The trouble-shooting display may comprise any information that the user needs to know to confirm that the monitor is not receiving signal from the computer system. The trouble-shooting display may also contain a series of steps instructing the user to investigate possible problems that the monitor may encounter and possible methods to remove such problems.

Once the problems are removed, the monitor will operate in a normal manner to display the information from the computer system. An information may be shown on the CRT 18 to indicate the normal operation of the monitor.

Figure 2:
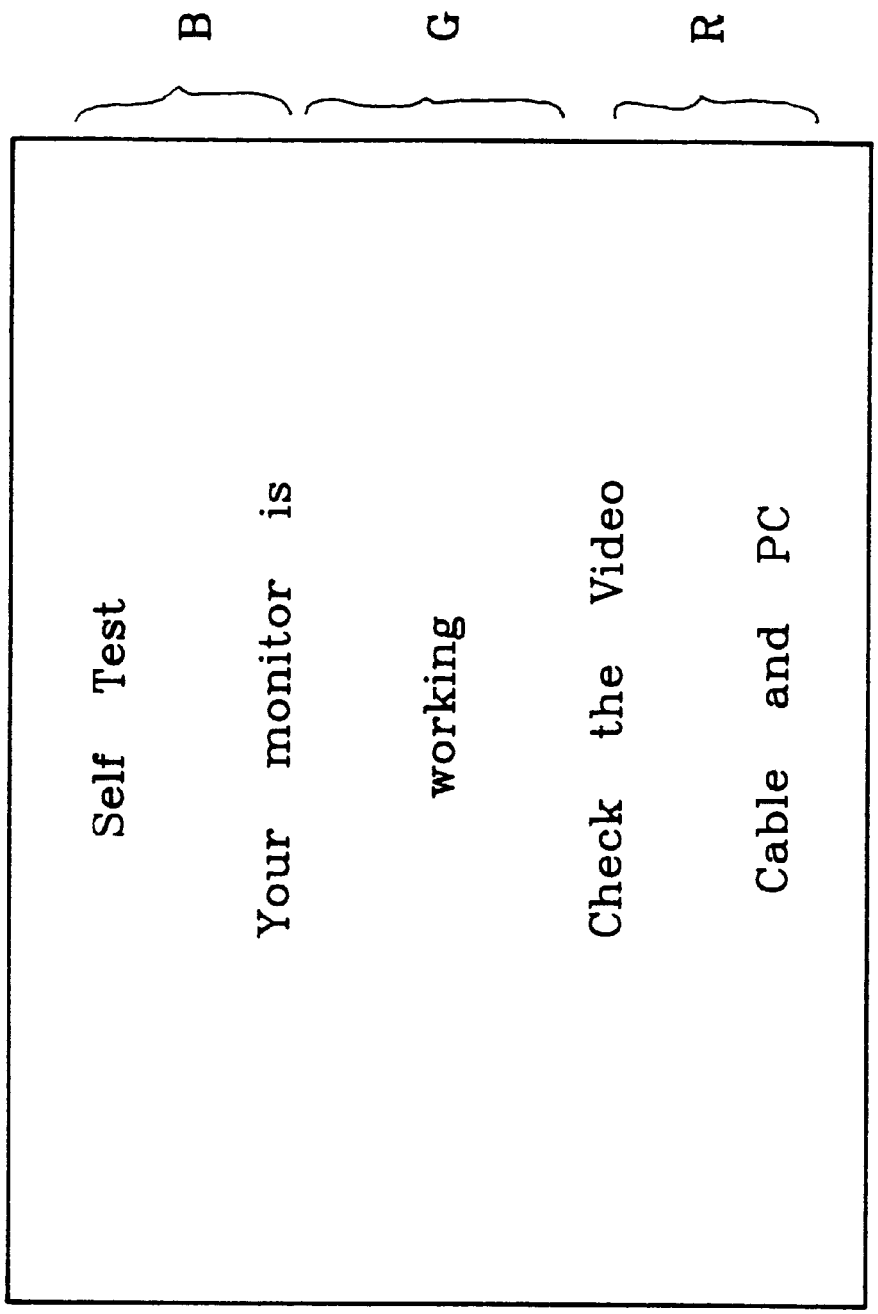
FIG. 2 shows a monitor self-testing image which is shown on the monitor screen in accordance with the present invention.

In accordance with another aspect of the present invention, the display of the trouble-shooting steps is incorporated with a monitor self-testing image to test the color display function of the monitor. An example of the self-testing image is illustrated in FIG. 2, wherein a plurality of words that demonstrate the trouble-shooting steps are displayed. The screen background of the testing image comprises the three elementary colors. For example, in the illustration of FIG. 2, the words "Self Test" has a blue (B) background; "Your monitor is" and "working" have a green (G) background; and "Check the Video" and "Cable and PC" have a red (R) background. All the words are in white color. If any of the three elementary colors is missed, then the user will be readily aware of the missing color. For example, if red is missing, then the background of "Check the Video" and "Cable and PC" disappears and all the words become light blue (the result of combination of blue and green); if green is missing, then the background of "Your monitor is" and "Working" disappears and all the words become pink (the result of combination of blue and red). This provides the user with a measure to check the color display function of the monitor. With this arrangement, the user may test the color display function of the monitor at the same when the trouble-shooting steps are followed to fix the problem of the monitor.

In accordance with a further aspect of the present invention, if while the monitor is functioning properly, the H-SYNC and V-SYNC signals are accidently cut off so that the MCU 11 receives no such signals, then the monitor enters a power saving status which satisfies the VESA DPMS standard.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. An interactive monitor trouble-shooting device, comprising:

an on-screen display circuit; and a micro-processed control unit for receiving a horizontal synchronization signal and a vertical synchronization signal from a video card of a computer and properly displaying information from the computer on a screen, wherein, when a monitor of the computer is powered on and the control unit does not receive the horizontal synchronization signal and the vertical synchronization signal, the control unit signals the on-screen display circuit of the monitor to:

(a) display information on the screen of the monitor, the information including a series of trouble-shooting steps to instruct a user of potential steps for fixing the problem that the monitor is not receiving the horizontal synchronization signal and the vertical synchronization signal; and (b) perform a color self-test on the monitor, wherein, if the monitor is properly displaying all colors, the monitor will display the color green in a first area of the screen, the color blue in a second area of the screen, and the color red in a third area of the screen, and if the monitor is not properly displaying all colors, at least one of the first, second, or third areas of the screen will not display its associated color.

2. A method for informing a user of a status of a color computer monitor and trouble-shooting problems associated with use of the color computer monitor, wherein the monitor includes a micro-processor based control unit connected to a video card of a computer and a display circuit for displaying information on a screen of the monitor, the method comprising the steps of:

(1) detecting a horizontal synchronization signal and a vertical synchronization signal from the video card of the computer upon powering on the monitor;

(2) if the horizontal and vertical synchronization signals are properly received, then displaying information from the computer on the screen;

(3) if no synchronization signals are detected when the monitor is powered on, then using the control unit to: (a) display a series of trouble-shooting steps on the screen to advise a user of potential steps for fixing the trouble, and (b) perform a color self-test on the monitor, wherein, if the monitor is properly displaying all colors, the monitor will display the color green in a first area of the screen, the color blue in a second area of the screen, and the color red in a third area of the screen, and if the monitor is not properly displaying all colors, at least one of the first, second, or third areas of the screen will not display its associated color; and (4) if the trouble is properly fixed, then displaying information from the computer on the screen.

3. The method as claimed in claim 2, wherein in the step of displaying the trouble-shooting steps on the screen, the trouble-shooting steps are displayed with white as a foreground color.

4. The method as claimed in claim 2, further comprising a step of allowing the monitor to enter a power saving mode when the horizontal and vertical synchronization signals are cut off during normal operation of the monitor.

5. An interactive monitor trouble-shooting device as claimed in claim 1, further including means for activating a power saving mode when the horizontal and vertical synchronization signals are cut off during normal operation of the monitor.

* * * * *